US012517590B1

(12) United States Patent
Nigam et al.

(10) Patent No.: US 12,517,590 B1
(45) Date of Patent: Jan. 6, 2026

(54) NEAR INFRASONIC SOUND-BASED CONTROL SYSTEM

(71) Applicant: Maxim Integrated Products, Inc., San Jose, CA (US)

(72) Inventors: Vivek Prakash Nigam, Dublin, CA (US); Jonathan Chien, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 191 days.

(21) Appl. No.: 18/242,902

(22) Filed: Sep. 6, 2023

Related U.S. Application Data

(60) Provisional application No. 63/374,814, filed on Sep. 7, 2022.

(51) Int. Cl.
*G06F 3/01* (2006.01)
*H04R 1/08* (2006.01)
*H04R 1/10* (2006.01)
*H04R 3/04* (2006.01)

(52) U.S. Cl.
CPC ............. *G06F 3/017* (2013.01); *H04R 1/08* (2013.01); *H04R 1/1016* (2013.01); *H04R 1/1041* (2013.01); *H04R 3/04* (2013.01); *H04R 2460/13* (2013.01)

(58) Field of Classification Search
None
See application file for complete search history.

(56) References Cited

U.S. PATENT DOCUMENTS

2019/0333367 A1* 10/2019 Shimizu ................ G06F 3/017
2019/0384409 A1* 12/2019 Omer ................... G01S 13/878

FOREIGN PATENT DOCUMENTS

WO    WO2019056236 A1 *  3/2019

OTHER PUBLICATIONS

English language translation of WO 2019/056236 A1, pp. 1-12. (Year: 2019).*

* cited by examiner

*Primary Examiner* — Paul W Huber
(74) *Attorney, Agent, or Firm* — DLA Piper LLP (US)

(57) ABSTRACT

A near infrasonic sound-based control system and method for a wearable electronic device can include: detecting a near infrasonic sound wave with a microphone, the near infrasonic sound wave resulting from a gesture of a user, correlating an input command to the near infrasonic sound wave; and executing the input command on the wearable electronic device.

17 Claims, 4 Drawing Sheets

NEAR INFRASONIC SOUND-BASED CONTROL SYSTEM

CROSS-REFERENCE TO RELATED APPLICATION(S)

This claims priority benefit to all common subject matter of U.S. Provisional Patent Application 63/374,814 filed Sep. 7, 2022. The content of this application is incorporated herein by reference.

TECHNICAL FIELD

This disclosure relates to wearable electronics, more particularly to near infrasonic sound-based control for wearable electronics.

BACKGROUND

The rapidly growing market for portable electronics devices including cellular phones, laptop computers, and wearables, is an integral facet of modern life. These devices have unique attributes that have significant impacts on manufacturing and design in that they must be generally small, lightweight, and rich in functionality and they must be produced in high volumes at relatively low cost.

As an extension of the consumer electronics industry, the wearable electronics industry has witnessed ever-increasing commercial competitive pressures, along with growing consumer expectations and the diminishing opportunities for meaningful product differentiation in the marketplace. The advancement towards miniaturization has imposed constraints to the design of wearable electronic including reduction of surface area for buttons and touch sensitive surfaces.

Furthermore, miniaturized wearable electronics must interface with the human body with curved surfaces, which are not ideal for the integration of capacitive touch surfaces. Providing an intuitive, reliable, and robust user interface for miniaturized wearable electronics therefore represents a problem that has been long felt within the industry. Previous developments have attempted to solve this problem in many ways.

One such previous development is the use of voice commands. Voice commands provide only a partial solution in that voice commands can be difficult to use in public, when secrecy is needed, or when ambient noise prevents commands from being understood.

Another such previous development includes detecting a vibration as an input using accelerometers. Accelerometers are another example of a partial solution because the mechanical vibrations detected by an accelerometer are not easily detectable but must be large enough to be detected as mechanical vibration by the accelerometer within the wearable electronic.

Practically, reliance on an accelerometer can limit the area of input detection to a very small patch of skin next to the wearable electronic, which might not be available. Reliance on an accelerometer can also limit the kinds of detectable inputs to those movements sufficiently intense to be detected using the accelerometer, which gives rise to two additional problems. When a strong movement is used it can be uncomfortable, and when softer inputs are used it can go undetected resulting in lack of reliability.

The mechanical vibrations detected by accelerometers must also propagate through the wearable electronic itself, which could be difficult if the wearable electronic has a silicon interface, common in earbuds. The mass of the accelerometer, its position within the wearable electronic, and its distance from contact with the user can change the mechanical vibration detected by the accelerometer. The use of mechanical waves, detectable with accelerometers, therefore, requires each type of device to be individually designed and calibrated to detect user mechanical vibrations which increases costs and complexity while decreasing usability.

In view of the ever-increasing commercial competitive pressures, along with growing consumer expectations and the diminishing opportunities for meaningful product differentiation in the marketplace, it is critical that answers be found for these problems. Thus, a need remains for an intuitive, reliable, and robust wearable electronics user interface. Solutions to these problems have been long sought but prior developments have not taught or suggested any solutions and, thus, solutions to these problems have long eluded those skilled in the art.

BRIEF DESCRIPTION OF THE DRAWINGS

The near infrasonic sound-based control system is illustrated in the figures of the accompanying drawings which are meant to be exemplary and not limiting, in which like reference numerals are intended to refer to like components, and in which.

DETAILED DESCRIPTION

Figure 1:
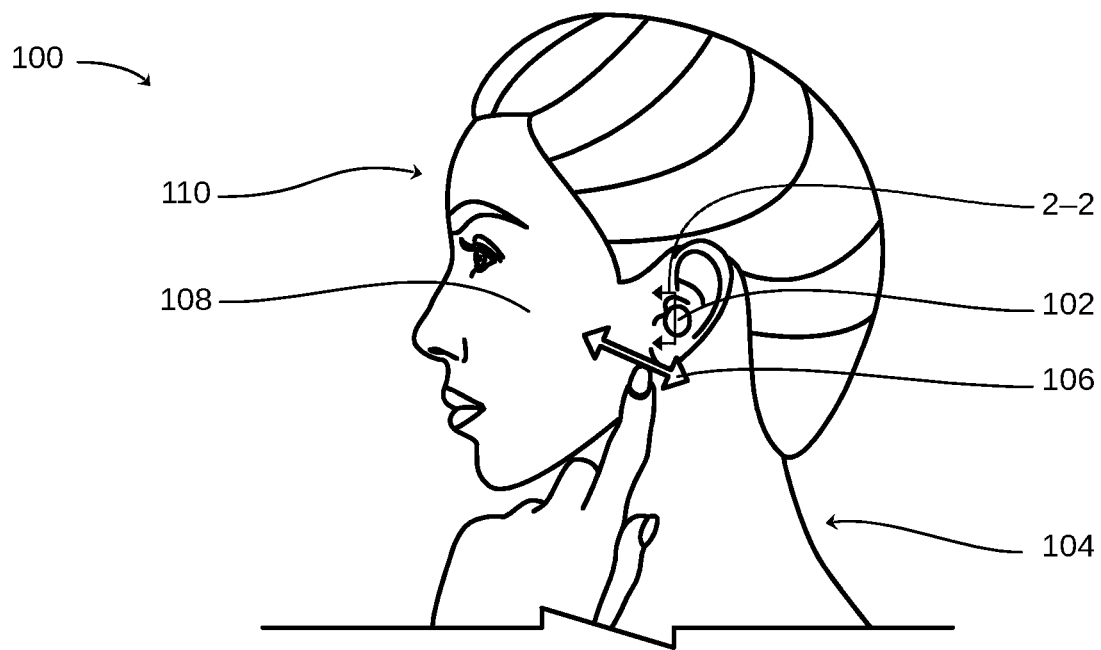
FIG. 1 is an isometric view of the control system.

In the following description, reference is made to the accompanying drawings that form a part hereof, and in which are shown by way of illustration, embodiments in which the control system may be practiced. It is to be understood that other embodiments may be utilized and structural changes may be made without departing from the scope of the control system.

When features, aspects, or embodiments of the control system are described in terms of steps of a process, an operation, a control flow, or a flow chart, it is to be understood that the steps can be combined, performed in a different order, deleted, or include additional steps without departing from the control system as described herein.

The control system is described in sufficient detail to enable those skilled in the art to make and use the control system and provide numerous specific details to give a thorough understanding of the control system; however, it will be apparent that the control system may be practiced without these specific details.

In order to avoid obscuring the control system, some well-known system configurations and descriptions are not disclosed in detail. Illustratively, analog-to-digital converter circuitry, digital signal processing techniques, machine learning, adaptive filters, and similar technologies commonly used in hearable devices employing active noise cancellation, are not described in detail and should be understood as within the skill of those having ordinary skill in the hearable device arts.

Likewise, the drawings showing embodiments of the system are semi-diagrammatic and not to scale and, particularly, some of the dimensions are for the clarity of presentation and are shown greatly exaggerated in the drawing FIGs. As used herein, a hearable device is to be understood as any wearable electronic device providing sound for a user to hear.

As used herein, "near infrasonic" is meant to refer to a low frequency sound near the lower frequency threshold of human hearing produced by a gesture on the skin of a user. The term "near infrasonic" is not to be understood herein as limited to sound below the lower frequency threshold of human hearing.

Referring now to FIG. 1, therein is shown an isometric view of the control system 100. The control system 100 is implemented within a wearable electronic device depicted as a hearable device 102 or an earbud worn in the ear of a user 104.

The hearable device 102 depicts the growing trend of miniaturization in electronic devices making touch-based interaction with them difficult. The control system 100 can provide a control interface for the hearable device 102 even when the hearable device 102 is too small for touch sensitive surfaces or buttons.

The control system 100 can detect gestures 106 on the face of the user 104. The gesture 106 depicted, can be one or more swipes on a checkbone 108 of the user 104, one or more taps, or a combination of taps and swipes.

For descriptive clarity, the gesture 106 will be referred to herein as a tap or a tapping motion; however, as described and depicted, other gestures are contemplated. With reference to the tapping gesture, many variations are contemplated. The gesture 106 could be comprised of a unique sequence of short taps, long taps, and durations of no-tapping between taps.

Figure 2:
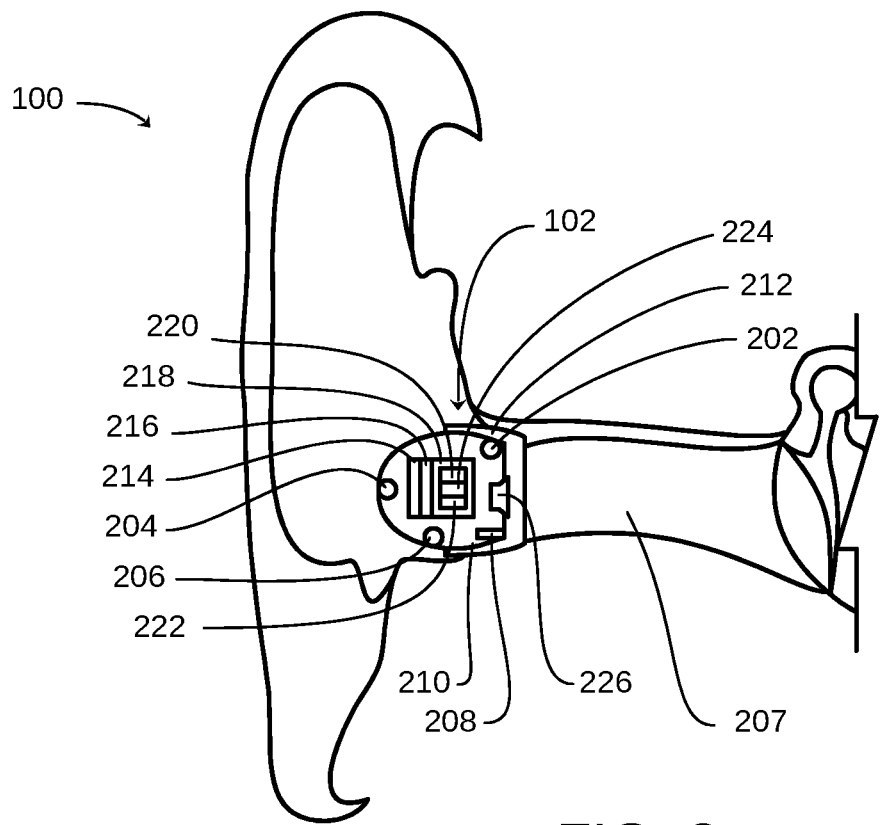
FIG. 2 is a cross-sectional view of the hearable device along the line 2-2 of FIG. 1.

Each of the gestures 106 comprised of a unique sequence of taps can be mapped and correlated to commands for control of the hearable device 102, and stored within the library 224 of FIG. 2. As an illustrative example, in one embodiment a single tap could trigger the toggling of a pause-play command while a double tap could move to a next track or hang up a telephone call. These gesture 106 based commands can augment an existing library of voice commands and could be used interchangeably with voice commands to control the hearable device 102.

Figure 3:
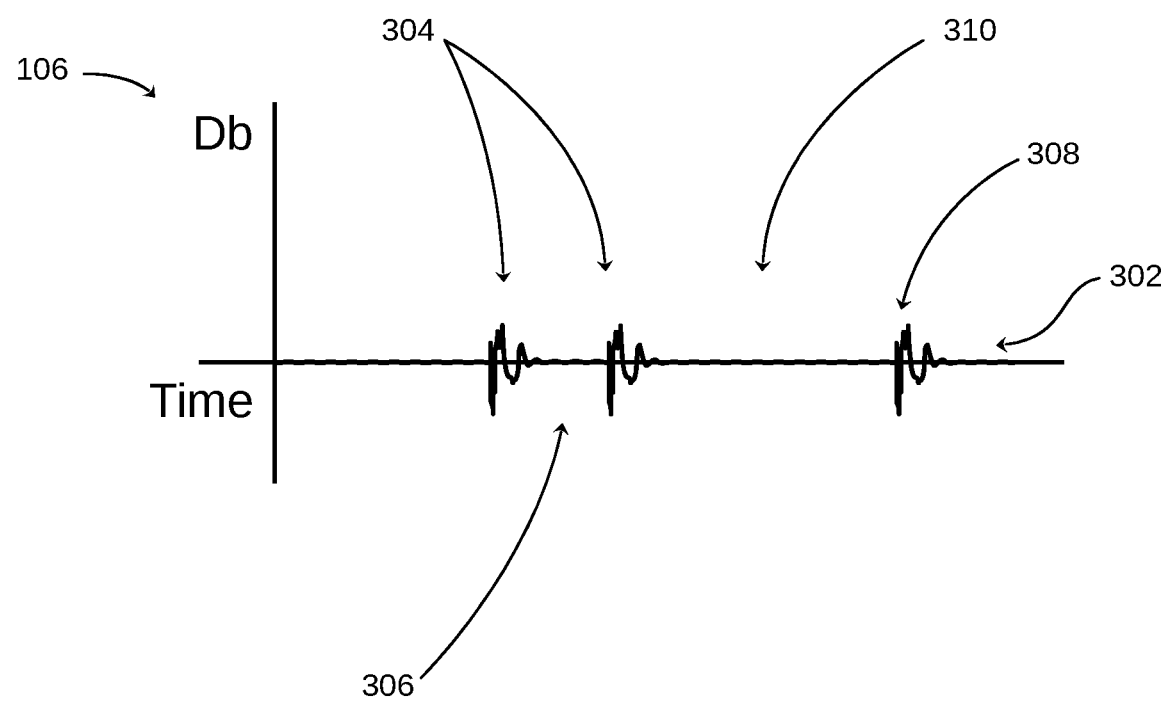
FIG. 3 is a graphical timing diagram for the gesture of FIG. 1.

It has been discovered that the gesture 106 can form or create the near infrasonic sound wave 302 of FIG. 3, which can be conducted through a skull 110 or bone structure of the user 104. This is especially true when the gesture 106 is implemented as a tap on a checkbone 108 or other bone in the skull 110.

Because the skull 110 of the user 104 can conduct the gesture 106 therethrough, the gesture 106 is not required to be performed in close proximity to the hearable device 102, such as on the checkbone 108 next to the hearable device 102. Rather, the control system 100 can detect the gesture 106 on other surfaces such as on the forehead, bridge of the nose, or jaw. It is contemplated that the gesture 106 might also be detectable on the cheekbone 108 opposite the hearable device 102.

Referring now to FIG. 2, therein is shown a cross-sectional view of the hearable device 102 along the line 2-2 of FIG. 1. The hearable device 102 is depicted having microphones including a feedback microphone 202, a feed-forward microphone 204, and a voice input microphone 206. The microphones can be components that generate or modulate electric current based on sound waves.

Figure 4:
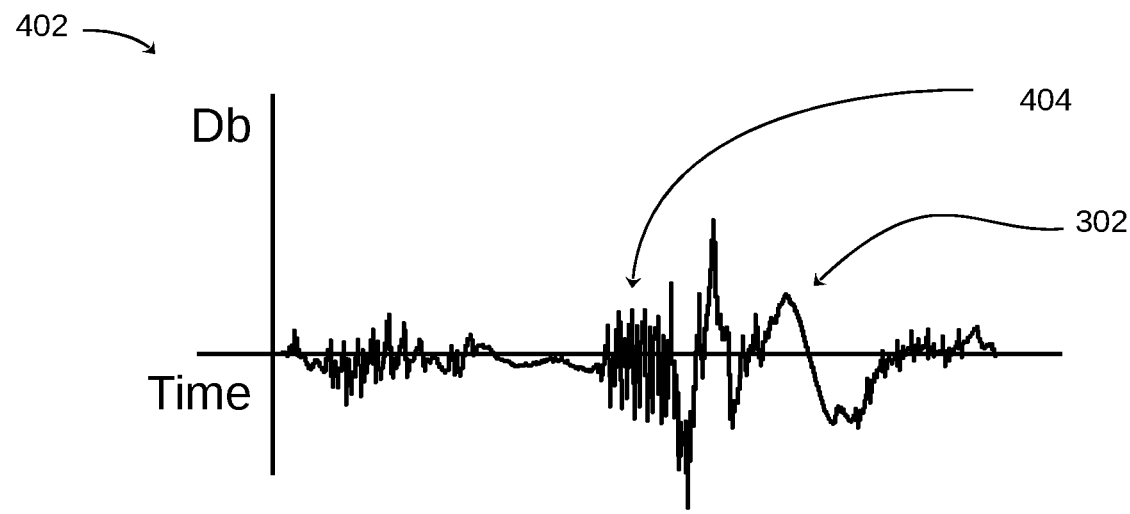
FIG. 4 is a graphical timing diagram for feedback microphone of FIG. 2.

The feedback microphone 202 can detect sounds, from within an ear canal 207 of the user 104, including speech and physiological sounds such as chewing or other facial movements, which are depicted as the mixed sound 402 of FIG. 4. More specifically, the feedback microphone 202 can detect the gesture 106 of FIG. 1 as the near infrasonic sound wave 302 of FIG. 3.

Figure 5:
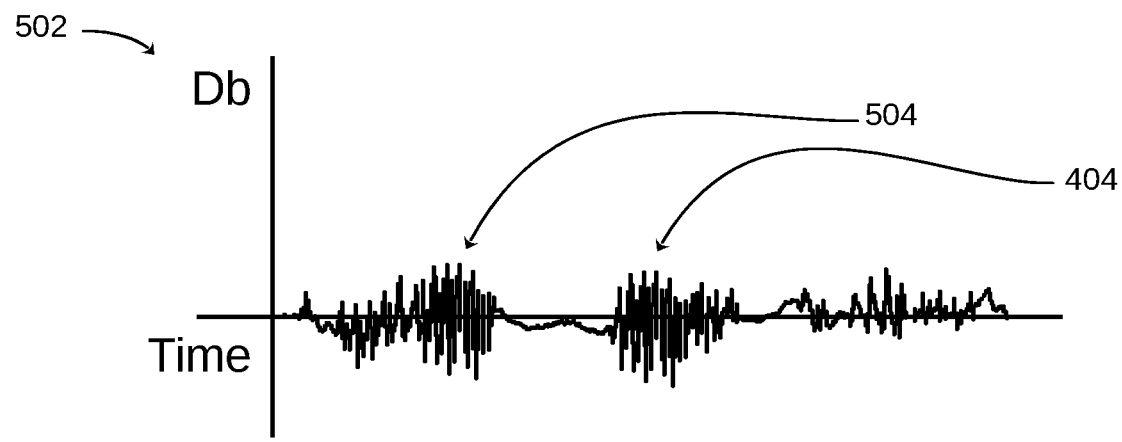
FIG. 5 is a graphical timing diagram for the feedforward microphone of FIG. 2.

The feedforward microphone 204 and the voice input microphone 206 can detect the external sound 502 of FIG. 5. The external sound 502 can include speech but can also include ambient noise from the environment, and is to be understood herein as any sound detected by the hearable device 102 that has a source external to the ear canal 207. That is, the external sound 502 is sound from the environment rather than from the ear canal 207 of the user 104.

The feedback microphone 202 can detect speech of the user 104 and the external sound 502, although the external sound 502 is detected with a reduced intensity. The feedback microphone 202 can also detect music playing on the hearable device 102 or the contents of a phone call to the user of the hearable device 102, for example.

The gesture 106 of tapping on the checkbone 108 of FIG. 1 can produce the near infrasonic sound wave 302, which can be conducted through the bones of the skull 110 of FIG. 1 and detected by the feedback microphone 202. It has been discovered that detecting the near infrasonic sound wave 302 with the feedback microphone 202 improves the control system 100 by allowing the gesture 106 to be performed on the skull 110 of the user 104, and not just in the immediate vicinity of the hearable device 102.

Furthermore, it has been discovered that detecting the near infrasonic sound wave 302 with the feedback microphone 202 rather than mechanical vibrations with an accelerometer 208 contained within the hearable device 102 allows for the gesture 106 to be recognized regardless of the form factor of a body housing 210 of the hearable device 102 or regardless of a contact interface 212 between the hearable device 102 and the user 104. This is due to the propagation of the wave to the detecting sensor; with an accelerometer the mechanical wave must traverse through the hearable device 102 prior to detection, while the feedback microphone 202 can detect the near infrasonic sound wave 302 directly from within the ear canal 207 of the user 104.

That is, the waveforms of gestures detected with the accelerometer 208 can change if the form factor of the body housing 210 changes, the contact interface 212 changes, or the mounting between the accelerometer 208 and the body housing 210 changes. On the other hand, the near infrasonic sound wave 302 detected by the feedback microphone 202 is the same regardless of the design of the body housing 210, the contact interface 212, or the feedback microphone's 202 mount.

Many benefits therefore result from the detection of the near infrasonic sound wave 302 with the feedback microphone 202 over the detection of a wave through the accelerometer 208. One benefit is that any form factor can be used whether the contact interface 212 is silicon or hard plastic. This reduces costs of design and calibration by allowing the standardized detection of the near infrasonic sound wave 302 across many form factors rather than requiring a specifically calibrated and designed control system using the accelerometer 208. Another benefit discovered from utilizing the near infrasonic sound wave 302 detected with the feedback microphone 202 is that the signal from the feedback microphone 202 captures less ambient noise and thereby provides a high signal to noise ratio.

The hearable device 102 can further include a battery 214, a processor 216, and memory 218. The memory 218 can contain gesture models 220, input commands 222, and a library 224.

The gesture models 220 can be representations of uniquely shaped near infrasonic sound waves which are stored in the memory 218 for each gesture 106 that the control system 100 is able to determine. The processor 216 can compare the shape of the near infrasonic sound wave 302 detected by the feedback microphone 202 with the gesture models 220 to determine what gesture 106 was performed by the user 104.

Alternatively, the processor 216 could use a near infrasonic frequency window and duration thresholds to isolate and determine the gesture 106 performed by the user 104. The library 224 can be a list of the input commands 222 for the hearable device 102 associated with specific gestures 106 for triggering the input command 222.

Once the processor 216 has isolated and determined the gesture 106 of the user 104, the processor 216 can determine the input command 222 associated with the determined gesture 106 from the library 224 and execute the input command 222 on the hearable device 102.

The processor 216 of the hearable device 102 can provide signal processing for signals detected by the feedforward microphone 204 and the feedback microphone 202 in the form of active noise cancellation.

Prior to determining the gesture 106, the processor 216 can isolate and determine the near infrasonic sound wave 302 from the mixed sound 402 by filtering out or reducing sound attributable to the external sound 502 including speech and ambient noise. For example, this could be done by adaptively removing the external sound 502 detected on the feedforward microphone 204 and the voice input microphone 206 from mixed sound 402 detected by the feedback microphone 202. Filtering out or reducing the external sound 502 from the mixed sound 402 can remove the speech component from the mixed sound 402 leaving the near infrasonic sound wave 302.

The near infrasonic sound wave 302 can also be isolated with a low-pass frequency filter. That is, the near infrasonic sound wave 302 has a frequency of around 30 Hz while the speech 404 of FIG. 4 can have a frequency of between 85 Hz and 250 Hz, allowing easy isolation and identification of the near infrasonic sound wave 302 from the rest of the mixed sound 402 detected by the feedback microphone 202.

As a modification to the frequency filter previously described, the near infrasonic sound wave 302 can also be isolated using digital signal processing techniques including an adaptive filter such as those employed in modern active noise cancellation and echo cancellation. The adaptive filter can be a digital filter employing a self-adjusting or adaptive algorithm that can adjust many filtering coefficients for filtering the mixed sound 402 and isolating the near infrasonic sound wave 302 based on the inputs from the feedforward microphone 204, the feedback microphone 202, and the voice input microphone 206.

Further, the shape of the near infrasonic sound wave 302 itself is highly unique. The near infrasonic sound wave 302 can be detected and isolated from speech 404, ambient noise, and physiological sounds based on this shape alone. Machine learning techniques using large training sets can be used by the digital filter 702 to identify the unique shape of the near infrasonic sound wave 302.

Illustratively, it is contemplated that the processor 216 could detect the near infrasonic sound wave 302 with a machine learning algorithm which can be trained to detect the near infrasonic sound wave 302 from the mixed sound 402. It is contemplated that the processing and storage needs of the hearable device 102 could also be met by a distributed network of other devices offering processing or storage for the hearable device 102 including signal processing or library storage on a networked device. The hearable device 102 is also depicted having a speaker 226 affixed near the feedback microphone 202.

Referring now to FIG. 3, therein is shown a graphical timing diagram for the gesture 106 of FIG. 1. The diagram expresses acoustic energy in decibels along the vertical axis and time along the horizontal axis.

The gesture 106 is represented by a near infrasonic sound wave 302 with the specific shape depicted. Illustratively, for example, the gesture 106 could include two taps 304 separated by a short no-tapping duration 306 followed by a third tap 308 separated by a long no-tapping duration 310.

Referring now to FIG. 4, therein is shown a graphical timing diagram for the feedback microphone 202 of FIG. 2. The diagram expresses acoustic energy in decibels along the vertical axis and time along the horizontal axis.

The feedback microphone 202 can detect mixed sound 402 from within the ear canal 207 of FIG. 2 of the user 104 of FIG. 1. The mixed sound 402 can include speech 404 of the user 104, physiological sounds of the user 104 such as chewing or other facial movements, and the gestures 106 of FIG. 1.

Additionally, the mixed sound 402 can include other interferences such as music and calls being rendered by the speaker 226 of FIG. 2. These interfering sounds by the speaker 226 would also be captured by the feedback microphone 202. Furthermore, active noise cancellation sound, generated by the speaker 226, can be detected by the feedback microphone 202 and be present in the mixed sound 402.

The speech 404 of the user 104 is represented by higher frequency sound while the gesture 106 is represented by the near infrasonic sound wave 302. The near infrasonic sound wave 302 correlating to the gesture 106 is combined with the speech 404 in the mixed sound 402 but is still visible and detectable due to the unique shape and frequency of the near infrasonic sound wave 302. The feedback microphone 202 detects the external sound 502 of FIG. 5 including ambient noise and speech from other people, but at a decreased intensity.

Referring now to FIG. 5, therein is shown a graphical timing diagram for the feedforward microphone 204 of FIG. 2. The diagram expresses acoustic energy in decibels along the vertical axis and time along the horizontal axis.

The feedforward microphone 204 can detect the external sound 502 from outside of the user 104 of FIG. 1. The external sound 502 can include the speech 404 from the user 104 of FIG. 1 or external speech 504 from other people nearby. The external sound 502 can also include ambient noise from the surrounding environment. The feedforward microphone 204, and the voice input microphone 206, do not detect the near infrasonic sound wave 302 of FIG. 3.

Figure 6:
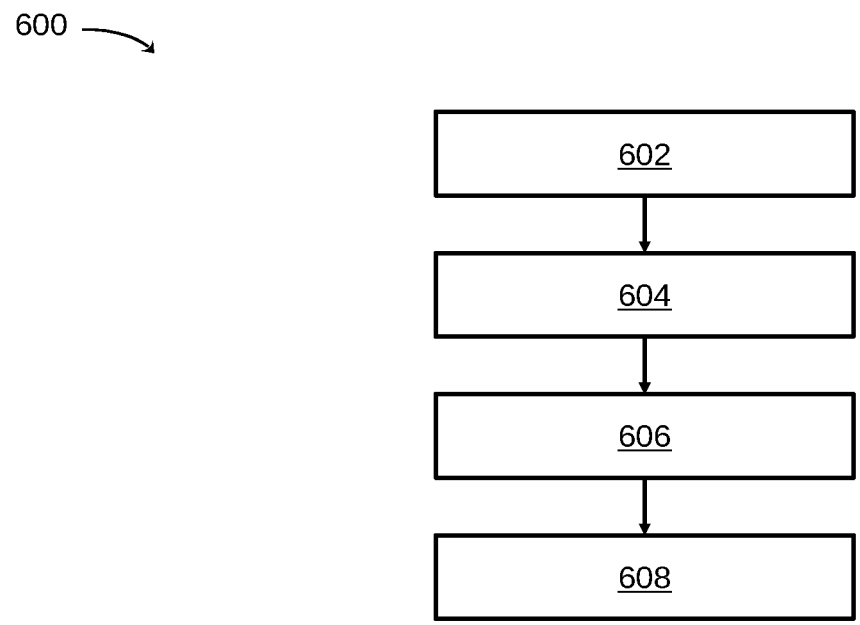
FIG. 6 is a control flow for a method of operating the control system of FIG. 1.

Referring now to FIG. 6, therein is shown a control flow 600 for a method of operating the control system for a wearable electronic device, such as the hearable device 102 of FIG. 1. The method can include detecting the near infrasonic sound wave 302 of FIG. 3 with the feedback microphone 202 of FIG. 2 within the hearable device 102, the near infrasonic sound wave 302 resulting from the gesture 106 of the user 104 both of FIG. 1, and the near infrasonic sound wave 302 detected from within an ear of the user 104 in a block 602; filtering physiological sound, external sound 502, sound rendered by a speaker, or a combination of these sounds from a feedback input signal 704 and thereby isolating the near infrasonic sound wave 302 in a block 604; correlating the input command 222 of FIG. 2 to the near infrasonic sound wave 302 with the processor 216 of FIG. 2 in a block 606; and executing the input command 222 on the hearable device 102 with the processor 216 in a block 608. The method can further include determining with the processor 216, the gesture 106 resulting in the low frequency sound wave 302 by matching a shape of the near infrasonic sound wave 302 to the gesture model 220 saved within the memory 218 of the hearable device 102.

The method of operating the control system 100 cannot practically be performed in the human mind, for instance when the human mind is not equipped to perform the claim limitations requiring the detection of the near infrasonic sound wave 302 using a microphone, or correlating the input command 222 to the near infrasonic sound wave 302 because near infrasonic sound waves 302 cannot be viewed, correlated, or isolated entirely in a human's mind.

Figure 7:
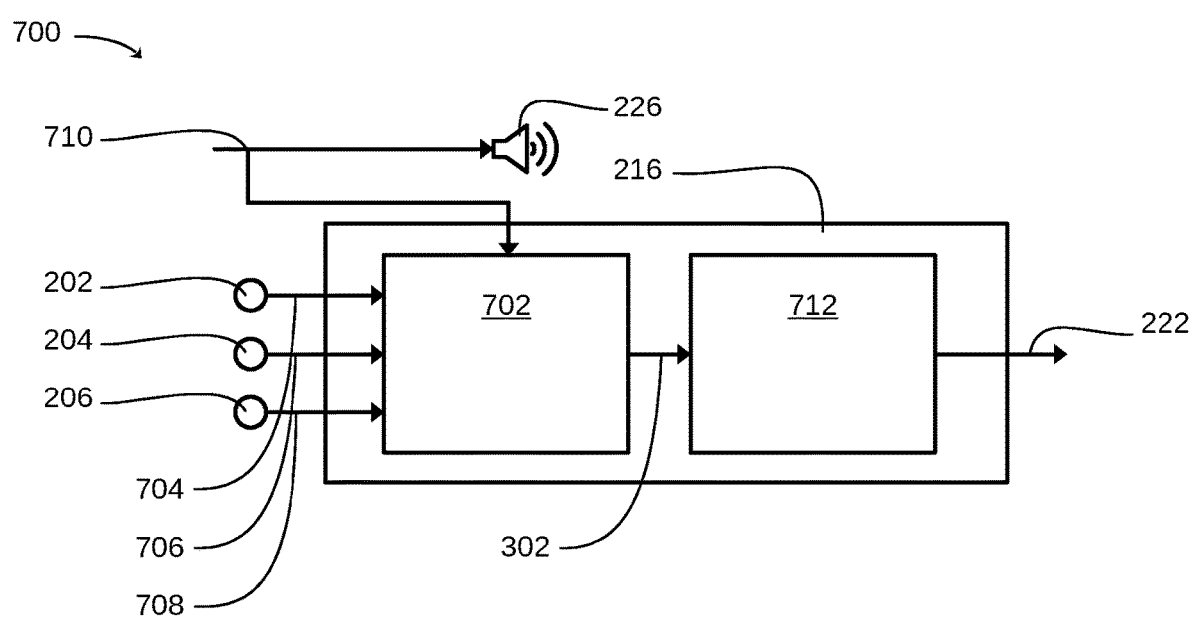
FIG. 7 is a block diagram of the control flow of FIG. 6.

Referring now to FIG. 7, therein is shown a block diagram 700 of the control flow 600 of FIG. 6. The block diagram 700 depicts the near infrasonic sound-based control system 100 having the feedback microphone 202, the feedforward microphone 204, and the voice input microphone 206 as inputs to the processor 216.

More particularly, the processor 216 can include a digital filter 702 which can be an adaptive digital filter. The digital filter 702 can receive a feedback input signal 704 from the feedback microphone 202, a feedforward input signal 706 from the feedforward microphone 204, a voice input signal 708 from the voice input microphone 206, and a speaker input signal 710 which can also be the input signal for the speaker 226.

The input signal for the speaker 226 can include music, calls, and active noise cancellation sounds to be rendered by the speaker 226. The digital filter 702 can receive the feedback input signal 704, the feedforward input signal 706, the voice input signal 708, and the speaker input signal 710; and can filter sounds, common to these signals and the feedback input signal 704, out of the feedback input signal 704.

The digital filter 702 can filter out frequencies and wave patterns from the feedback input signal 704 in order to isolate the near infrasonic sound wave 302 present only within the feedback input signal 704. That is, sounds found within the feedforward input signal 706, the voice input signal 708, and the speaker input signal 710 can be filtered out of, or reduced in, the feedback input signal 704 in order to isolate the near infrasonic sound wave 302.

Illustratively, this filtering of the feedback input signal 704 is a filtering out, or reducing, of the external sound 502 of FIG. 5 attributable to external sources. Furthermore, the near infrasonic sound wave 302 can be isolated and identified within the feedback input signal 704, by filtering the feedback input signal 704 itself to remove physiological sounds.

The physiological sounds can include sounds from chewing or other facial movements. The physiological sounds can be removed by filtering based on a duration of the sound being longer than a tap or swipe, or based on the shape of the sound not resembling a known gesture such as a tap or a swipe.

The output of the digital filter 702 can be the near infrasonic sound wave 302, which is isolated and identified by the digital filter 702. Once the processor 216 has isolated and determined near infrasonic sound wave 302, a gesture determiner 712 within the processor 216 can match the detected near infrasonic sound wave 302 with, and thereby determine, the gesture 106 of FIG. 1.

The gesture determiner 712 may implement digital signal processing to identify many attributes of the near infrasonic sound wave 302 and to determine the gesture 106. This can include counting the number of occurrences of the near infrasonic sound wave 302. This might result in the gesture determiner 712 determining the gesture 106 as a single tap, a double tap, a single swipe, a double swipe, or a combination thereof. The gesture 106 can be comprised of any number of taps or swipes and can be detected by the gesture determiner 712.

The gesture determiner 712 can also utilize the duration between occurrences of the near infrasonic sound wave 302. This might result in the gesture determiner 712 determining the gesture 106 as a fast tap, a slow tap, or a combination of fast and slow taps. The gesture determiner 712 could also determine the gesture was a combination fast and slow swipes.

The gesture determiner 712 can also utilize the duration of the near infrasonic sound wave 302 occurrences. This might result in the gesture determiner 712 determining the gesture 106 as a tap or a swipe.

Illustratively, the near infrasonic sound wave 302 that is short should result in the determination of a tap while the near infrasonic sound wave 302 that is long should result in the determination of a swipe.

It is contemplated that the gesture 106 could be any combination of speed, number, or duration of taps and swipes. The gesture determiner 712 of the processor 216 can match and determine the input command 222 associated with the determined gesture 106 from the library 224 of FIG. 2. The input command 222 can then be executed on the hearable device 102 of FIG. 1.

Thus, it has been discovered that the near infrasonic sound-based control system reflects an improvement in the functioning of hearable devices, by providing a solution to the problems discussed above regarding the mechanical vibrations detected by accelerometers and voice commands. The near infrasonic sound-based control system is a solution is necessarily rooted in hearable device technology in order to overcome a problem specifically arising in the realm of controlling miniaturized hearable devices.

The near infrasonic sound-based control system controls the technical process and the internal functioning of the hearable device itself. The near infrasonic sound-based control system therefore inherently comprises, or reflects, corresponding technical features of the hearable device.

The near infrasonic sound-based control system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the near infrasonic sound-based control system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of operating a near infrasonic sound-based control system for a wearable electronic device comprising:
   detecting a near infrasonic sound wave with a microphone, the near infrasonic sound wave resulting from a gesture, wherein detecting the near infrasonic sound wave resulting from the gesture includes detecting the near infrasonic sound wave resulting from the gesture conducted through a bone and into an ear canal;
   correlating an input command to the near infrasonic sound wave; and
   executing the input command on the wearable electronic device.

2. The method of claim 1 further comprising determining the gesture resulting in the near infrasonic sound wave by matching a shape of the near infrasonic sound wave to a gesture model saved within memory of the wearable electronic device.

3. The method of claim 1 further comprising filtering physiological sound, external sound, sound rendered by a speaker, or a combination of these sounds from an input signal and thereby isolating the near infrasonic sound wave.

4. The method of claim 1 further comprising isolating the near infrasonic sound wave using an adaptive filter.

5. The method of claim 1 wherein detecting the near infrasonic sound wave resulting from the gesture includes detecting the near infrasonic sound wave resulting from a tap.

6. The method of claim 1 wherein detecting the near infrasonic sound wave resulting from the gesture includes detecting the near infrasonic sound wave resulting from a swipe.

7. A non-transitory computer readable medium in useful association with a processor having instructions configured to:
   detect a near infrasonic sound wave with a microphone, the near infrasonic sound wave resulting from a gesture, wherein the instructions configured to detect the near infrasonic sound wave resulting from the gesture includes instructions configured to detect the near infrasonic sound wave resulting from the gesture conducted through a bone and into an ear canal;
   correlate an input command to the near infrasonic sound wave; and
   execute the input command on a wearable electronic device.

8. The computer readable medium of claim 7 further comprising instructions configured to determine the gesture resulting in the near infrasonic sound wave by matching a shape of the near infrasonic sound wave to a gesture model saved within memory of the wearable electronic device.

9. The computer readable medium of claim 7 further comprising instructions configured to filter physiological sound, external sound, sound rendered by a speaker, or a combination of these sounds from an input signal and thereby isolate the near infrasonic sound wave.

10. The computer readable medium of claim 7 further comprising instructions configured to isolate the near infrasonic sound wave using an adaptive filter.

11. The computer readable medium of claim 7 wherein the instructions configured to detect the near infrasonic sound wave resulting from the gesture includes instructions configured to detect the near infrasonic sound wave resulting from a tap.

12. The computer readable medium of claim 7 wherein the instructions configured to detect the near infrasonic sound wave resulting from the gesture includes instructions configured to detect the near infrasonic sound wave resulting from a swipe.

13. A near infrasonic sound-based control system for a wearable electronic device comprising:
   a microphone configured to detect a near infrasonic sound wave resulting from a gesture, wherein the microphone is configured to detect the near infrasonic sound wave resulting from the gesture conducted through a bone and into an ear canal; and
   a processor configured to correlate an input command to the near infrasonic sound wave and to execute the input command on the wearable electronic device.

14. The system of claim 13 wherein the processor is configured to determine the gesture resulting in the near infrasonic sound wave by matching a shape of the near infrasonic sound wave to a gesture model saved within memory of the wearable electronic device.

15. The system of claim 13 wherein the processor is configured to filter physiological sound, external sound, sound rendered by a speaker, or a combination of these sounds from an input signal and thereby isolate the near infrasonic sound wave.

16. The system of claim 13 further comprising an adaptive filter configured to isolate the near infrasonic sound wave.

17. The system of claim 13 wherein the microphone is configured to detect the near infrasonic sound wave resulting from a tap.

* * * * *